Aug. 23, 1932.    J. C. HIGGINS    1,873,403
AIR AND VACUUM RELIEF VALVE FOR PIPE LINES
Filed June 23, 1930
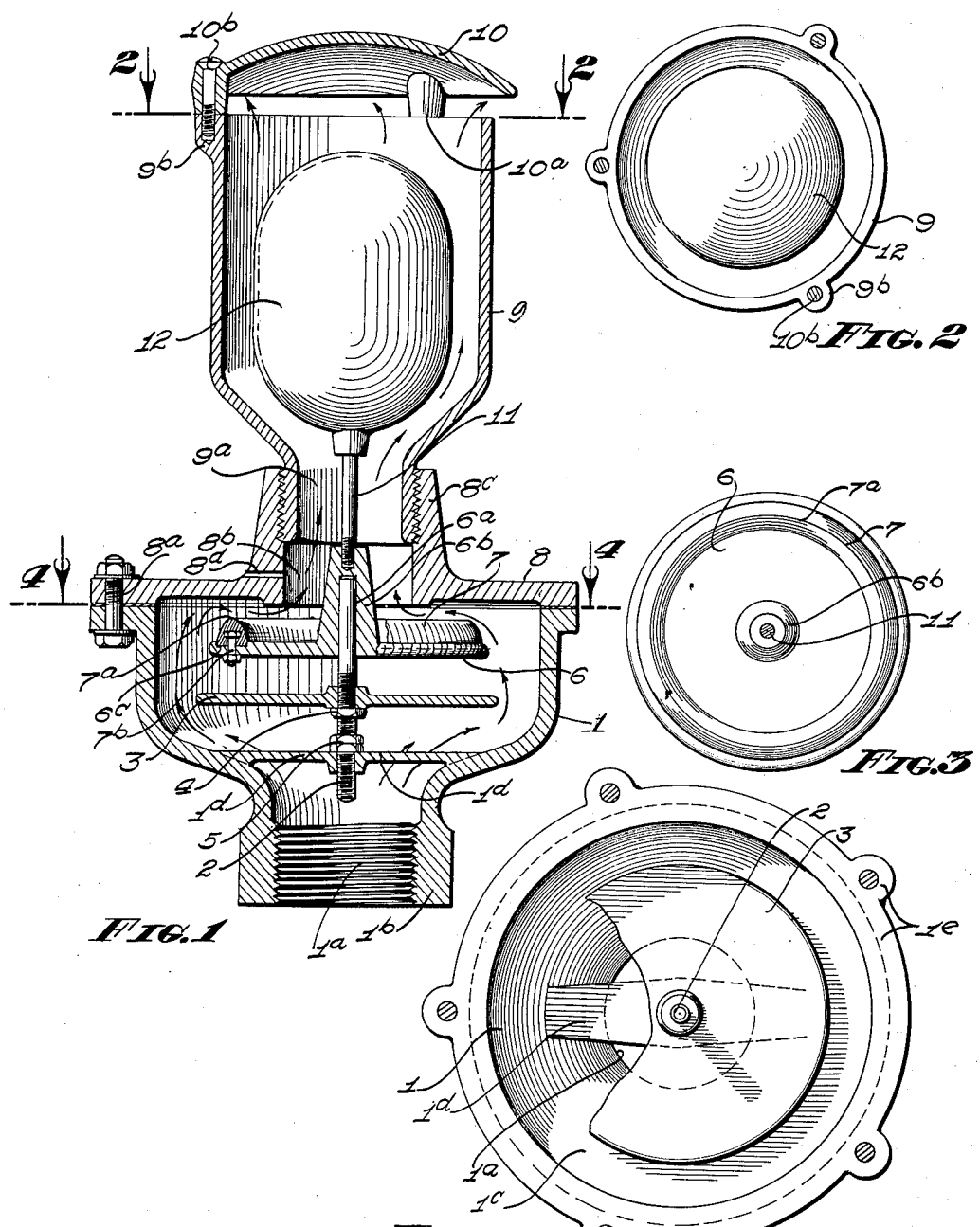
INVENTOR.
JOHN C. HIGGINS
BY A. B. Bowman
ATTORNEY Patented Aug. 23, 1932

1,873,403

UNITED STATES PATENT OFFICE

JOHN C. HIGGINS, OF SAN DIEGO, CALIFORNIA

AIR AND VACUUM RELIEF VALVE FOR PIPE LINES

Application filed June 23, 1930. Serial No. 462,986.

My invention relates to air and vacuum relief valve for pipe line, and the objects of my invention are:

First, to provide a valve of this class which acts automatically when the pipe line is being drained, as when a break in a pipe line occurs, so as to prevent the creation of vacuum in said pipe line and the consequential collapsing or injury to the line;

Second, to provide a valve of this class which allows the escape of air from said pipe line while said line is being filled with water, thereby increasing the efficiency of the pipe line;

Third, to provide a valve of this class which does not leak, even during long periods of inactivity and inattention;

Fourth, to provide a valve of this class which seats properly at all times so that the leakage of water from the pipe line is reduced to a minimum;

Fifth, to provide a valve of this class which is also adapted to operate in lines operating under low pressure, by the addition of simple auxiliary means;

Sixth, to provide a valve of this class which operates efficiently at high pressures for relieving air pressure and vacuum therein, and which at the same time operates as efficiently on extremely low pressure lines;

Seventh, to provide a valve of this class which, should the valve leak when in operation, may be readily repaired so as to form a water-tight seal while the valve remains in operation on the pipe line; and Eighth, to provide on the whole a novelly constructed air and vacuum relief valve which is particularly simple of construction proportional to its functions, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon, which form a part of this application, in which:

Figure 1 is a longitudinal sectional view of my air and vacuum relief valve with parts and portions shown in elevation; Fig. 2 is a plan view of the float casing with the cover thereof removed; Fig. 3 is a plan view of the valve plunger; and Fig. 4 is a plan view of the valve plunger housing with the valve plunger removed therefrom.

Similar characters of reference refer to similar parts and portions throughout the several views of the drawing.

Valve casing 1, valve stem 2, baffle plate 3, adjusting nut 4, lock nuts 5, valve body member 6, valve element 7, valve casing head 8, float shell 9, cover 10, float stem 11, and float 12 constitute the principal parts and portions of my air and vacuum relief valve.

The valve casing 1 is substantially cup-shaped having a centrally located inlet opening 1a at its lower side. The inlet opening 1a is surrounded by a depending internally threaded boss 1b, whereby said valve casing may be secured to the fittings of a pipe line. The interior of the casing 1 forms a chamber 1c.

Extending across the casing just above the inlet opening 1a, is a web 1d having a centrally located threaded hole therethrough adapted to receive the threaded lower end of the valve stem 2.

Adjustably supported by the valve stem a short distance above the web 1d is a baffle plate 3, which is circular and flat. The baffle plate is adapted to screw upon the valve stem and is held in any desired relation therewith by an adjusting nut 4.

The valve stem is adjustable longitudinally relative to the web 1d and locked in the desired position by lock nuts 5. The upper terminal of the valve stem 2 projects slightly above the upper or open end of the valve casing, and is adapted to fit in a socket 6a formed in the hub 6b of the valve body member 6. Downward movement of the valve body member is limited by the terminal of the valve stem engaging the end of the socket 6a. This lower position is shown by solid lines in Fig. 1 and is the open position of the valve body member.

The valve body member is flat except for its upwardly extending hub portion 6b. Near the periphery of the valve body member on its upward side is provided a shallow annular channel 6c, which is adapted to receive the lower or flat side of an annular valve element 7. The side walls of the valve element 7 curve upwardly and toward each other, forming a blunt annular peak 7a, which forms the valve seat. Cast in the valve 7 are a plurality of screws 7b which extend downwardly through the valve body member and are provided with suitable nuts.

A particular substance "bakelite" has been found the most suitable for this valve element. Instead of bolting the valve element, it may be cemented in place. By experiment, I have found that a "bakelite" valve element seated against a metal seat will not stick when the valve element remains inoperative for some time.

The upper end of the valve casing is provided with an outwardly extending flange 1e. Secured across the open upper end of the casing 1 by means of bolts 8a extending through the flange 1e, is a valve casing head 8. The head 8 is provided with a centrally located outlet opening 8b formed within an upwardly extending hollow annular boss 8c. The under surface of the head 8, between the opening and the margin thereof is flat and a portion thereof forms a seat for the valve element 7.

The hub 6b of the valve body member extends into the opening 8b. The extended portion of the hollow boss 8c is internally threaded to receive the constricted lower end 9a of a hollow float shell 9. The float shell is cylindrical and of constant diameter except for the constricted portion 9a. The upper end of the shell 9 is open and is adapted to receive a cover 10, which is dome-shaped and provided with downwardly extending lugs 10a, which rest upon the bosses 9b formed on the side of shell 9 at its upper portion. These lug portions 10a are secured to the shell 9 by screws 10b.

Secured into the end 6b of the valve body member is an upwardly extending stem 11, which is attached to the lower end of a float 12, mounted within the float shell 9.

When the valve is used with high pressure and moderate pressure pipe lines, the float valve and its shell may be omitted for reasons which will be brought out in the description of the operation of the valve. However, with low pressure pipe lines where the pressure is only a very few pounds, the float and its shell insure the proper operation of the valve.

Operation of my air and vacuum relief valve is as follows:

When the pipe line is empty the valve element is in the position shown by solid lines in Fig. 1. As the pipe fills with water, the air passes as indicated by the arrows, flowing upwardly through the inlet 1a, striking the baffle plate 3 and deflecting outwardly so that the air forms an annular stream contiguous to the side walls of the casing, which clears the under side of the valve body member so that said valve body member is practically uninfluenced by the dynamic action of the air, and hence cannot shift to a position contiguous to the valve seat where the static pressure of the air is sufficient to close the valve.

When connected with a moderate pressure or high pressure pipe line, the water upon reaching the valve is thrown back upon engaging the side walls of the housing after striking the baffle plate 3 and flows between said baffle plate and valve body element so as to exert an upward pressure on said valve body element and cause an upward movement thereof until the valve is pressed firmly against the valve casing head by the force of the water. This movement takes place so quickly that practically none of the water flows past the valve body member.

However, when the valve is used in connection with low pressure lines the flow of water may be too slow to operate the valve body member every time. Therefore, part of the water flows into the float shell 9 until the float 12 is buoyed thereby, whereupon the valve body member is drawn upwardly by the action of the float until seated. Once the valve body member is adjacent its seat relation, the pressure of water, though only slight, is sufficient to hold the valve body member in place.

In order to remove the water, which would otherwise stand in the shell member 9 for long periods of time, a small bleeder hole 8d is provided in the boss 8c of the valve casing head, as shown in Fig. 1.

The valve element 7 being made of bakelite cannot stick to the valve casing head; therefore, as soon as water begins draining from the pipe line and the pressure is removed from the valve, said valve body element drops to its lower position allowing large quantities of air to pass into the pipe line and relieve what vacuum would otherwise form there.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what

I claim as new and desire to secure by Letters Patent is:

1. In an air and vacuum relief valve, a casing having an inlet and an outlet, a transversely disposed valve means reciprocally mounted within said casing arranged to seal said outlet against the flow of liquids outwardly therethrough, and a baffle plate transversely disposed within said casing between said valve means and said inlet for deflecting fluids passing into said casing whereby gases only are rendered ineffectual to close said valve means.

2. In an air and vacuum relief valve, a casing having an inlet and an outlet, a stem extending between said inlet and outlet, a valve means slidably supported upon said stem and arranged to close said outlet against the flow of liquids outwardly therethrough, said valve means normally assuming a position in which said outlet is open, and baffle means arranged between said inlet and said valve means arranged to deflect gases into a relation ineffectual to close said valve means.

3. In an air and vacuum relief valve, a casing having an inlet and an outlet, a stem extending between said inlet and outlet, a valve means loosely supported upon said stem and arranged to close said outlet against the flow of liquids outwardly therethrough, said valve means normally assuming a position in which said outlet is open, and a baffle plate supported upon said stem arranged to deflect fluids from direct contact with said valve means.

4. In an air and vacuum relief valve, a casing having an inlet and an outlet, an annular valve seat surrounding said outlet, a stem extending between said inlet and outlet, a valve means slidably supported upon said stem and arranged to coact with said valve seat and seal against the flow of liquids outwardly therethrough, said valve means normally spaced from said valve seat, and a baffle plate adjustably supported upon said stem in spaced relation to said valve means for deflecting gases around said valve means.

5. In an air and vacuum relief valve, a casing having an inlet opening in the lower end and an outlet in the upper end, a valve seat in the upper end of said casing surrounding said optlet opening, a support disposed between said inlet and outlet openings, a valve means slidably mounted on said support and spaced from the side walls of said casing, said valve means arranged to coact with said valve seat and seal against the flow of liquids outwardly therethrough, and a baffle means supported below said valve means for deflecting a fluid stream to the side walls of said casing whereby the forces exerted by air are rendered ineffectual to close said valve means.

6. In an air and vacuum relief valve, a casing having an inlet and an outlet, a transversely disposed valve means reciprocally mounted within said casing arranged to seal said outlet, a baffle plate transversely disposed within said casting between said valve means and said inlet for deflecting fluids passing into said casing whereby at normal pressures the forces exerted by gases only are rendered ineffectual upon said valve means, a shell extending from said outlet, and a float within said shell, said float secured to said valve means, said float adapted to be buoyed by liquids which at sub-normal pressures pass said valve plunger, whereby said float draws said valve means into its sealing position.

7. In an air and vacuum relief valve, a casing having an inlet and an outlet, a stem extending between said inlet and outlet, a valve means slidably supported upon said stem and arranged to close said outlet, said valve means normally assuming a position in which said outlet is open. baffle means arranged between said inlet and said valve means arranged to deflect gases at normal pressures into ineffectual relation with said valve means, a shell extending from said outlet, and a float within said shell, said float secured to said valve means, said float adapted to be buoyed by liquids which at sub-normal pressures, pass said valve means, whereby said float draws said valve means into its sealing position.

8. In an air and vacuum relief valve, a casing having an inlet and an outlet, a stem extending between said inlet and outlet, a valve means slidably supported upon said stem and arranged to close said outlet, said valve means normally assuming a position in which said outlet is open, a baffle plate supported upon said stem arranged to deflect fluids from direct contact with said valve means, a shell extending from said outlet, and a float within said shell, said float secured to said valve means, said float adapted to be buoyed by liquids which pass at sub-normal pressures, said valve means, whereby said float draws said valve means into its sealing position.

9. In an air and vacuum relief valve, a casing having an inlet and an outlet, an annular valve seat surrounding said outlet, a stem extending between said inlet and outlet, a valve means slidably supported upon said stem and arranged to coact with said valve seat, said valve means being normally spaced from said valve seat, a baffle plate adjustably supported upon said stem in spaced relation to said valve means for deflecting gases at normal pressures around said valve means, a shell extending from said outlet, and a float within said shell, said float secured to said valve means, said float adapted to be buoyed by liquids which at sub-normal pressures pass said valve means, whereby said float draws said valve means into its sealing position.

10. In an air and vacuum relief valve, a casing having an inlet opening in the lower end and an outlet in the upper end, a valve seat in the upper end of said casing surrounding said outlet opening, a support disposed between said inlet and outlet openings, a valve means slidably mounted on said support and spaced from the side walls of said casing, said valve means arranged to coact with said valve seat, a baffle means supported below said valve means for deflecting a fluid stream to the side walls of said casing whereby at normal pressures air is rendered ineffectual to close said valve means, a shell extending upwardly from said casing and communicating with said outlet opening, a stem extending from said valve means into said shell, and a float mounted within said shell upon said stem, said float arranged to draw said valve means into sealed relation with said valve seat when liquids pass by reason of sub-normal pressures said valve plunger.

11. In an air and vacuum relief valve, a casing having an inlet and an outlet, a stem extending between said inlet and outlet, a valve body member supported by said stem, an annular valve seat surrounding said outlet, an annular non-sticking valve element mounted on said valve body member arranged to coact with said valve seat, and baffle means arranged to deflect air into a relation ineffectual to close said valve body member.

12. In an air and vacuum relief valve, a casing having an inlet and an outlet, a stem extending between said inlet and outlet, a valve body member supported by said stem, an annular valve seat surrounding said outlet, a bakelite valve element mounted on said valve body member arranged to coact with said valve seat, and baffle means arranged to deflect air into a relation ineffectual to close said valve body member.

In testimony whereof I have hereunto set my hand at San Diego, California, this 14th day of June, 1930.

JOHN C. HIGGINS.